(12) United States Patent
Iwaya

(10) Patent No.: US 7,871,203 B2
(45) Date of Patent: Jan. 18, 2011

(54) OPTICAL CONNECTOR UNIT

(75) Inventor: Mitsuhiro Iwaya, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/394,818

(22) Filed: Feb. 27, 2009

(65) Prior Publication Data

US 2009/0274432 A1 Nov. 5, 2009

(30) Foreign Application Priority Data

Mar. 3, 2008 (JP) ............................. 2008-051596

(51) Int. Cl.
G02B 6/38 (2006.01)
(52) U.S. Cl. ........................................ 385/75; 385/55
(58) Field of Classification Search .................. 385/75, 385/55
See application file for complete search history.

(56) References Cited

U.S. PATENT DOCUMENTS

| | | | | |
|---|---|---|---|---|
| 4,818,061 | A * | 4/1989 | Iwano et al. ................... | 385/72 |
| 5,018,316 | A * | 5/1991 | Mulholland et al. ........... | 451/364 |
| 5,042,891 | A * | 8/1991 | Mulholland et al. ........... | 385/93 |
| 5,123,071 | A * | 6/1992 | Mulholland et al. ........... | 385/53 |
| 5,386,486 | A * | 1/1995 | Fan et al. ...................... | 385/59 |
| 6,359,789 | B1 * | 3/2002 | Imabayashi et al. .......... | 361/796 |
| 6,464,403 | B1 * | 10/2002 | Koch et al. ..................... | 385/53 |
| 6,533,468 | B2 * | 3/2003 | Nakajima et al. .............. | 385/78 |
| 6,652,153 | B2 * | 11/2003 | Bates et al. .................... | 385/59 |
| 6,913,394 | B2 * | 7/2005 | Iwano et al. .................... | 385/78 |
| 7,690,848 | B2 * | 4/2010 | Faika et al. .................... | 385/59 |
| 2001/0012428 | A1 * | 8/2001 | Nakajima et al. .............. | 385/78 |
| 2002/0150344 | A1 * | 10/2002 | Chiu et al. ...................... | 385/53 |
| 2002/0168148 | A1 * | 11/2002 | Gilliland et al. ................ | 385/59 |
| 2003/0012512 | A1 * | 1/2003 | Grimes et al. .................. | 385/53 |
| 2003/0108301 | A1 * | 6/2003 | Bates et al. ..................... | 385/59 |
| 2004/0076377 | A1 * | 4/2004 | Mizukami et al. .............. | 385/77 |
| 2005/0117854 | A1 * | 6/2005 | Chiu et al. ...................... | 385/92 |
| 2005/0232550 | A1 * | 10/2005 | Nakajima et al. .............. | 385/60 |
| 2005/0259924 | A1 * | 11/2005 | Krahenbuhl et al. ........... | 385/88 |
| 2007/0280599 | A1 * | 12/2007 | Faika et al. ..................... | 385/50 |
| 2008/0044136 | A1 * | 2/2008 | Kanou et al. ................... | 385/39 |
| 2008/0085082 | A1 * | 4/2008 | Theis ............................. | 385/72 |
| 2008/0112671 | A1 * | 5/2008 | Kanou et al. ................... | 385/56 |
| 2008/0112673 | A1 * | 5/2008 | Kanou et al. ................... | 385/78 |
| 2008/0131055 | A1 * | 6/2008 | Parkman et al. ............... | 385/58 |
| 2010/0086267 | A1 * | 4/2010 | Cooke et al. ................. | 385/100 |

FOREIGN PATENT DOCUMENTS

| JP | 5-119239 | 5/1993 |
|---|---|---|
| JP | 10-31131 | 2/1998 |

* cited by examiner

Primary Examiner—K. Cyrus Kianni
(74) Attorney, Agent, or Firm—Oblon, Spivak, McClelland, Maier & Neustadt, L.L.P.

(57) ABSTRACT

An optical connector unit includes optical fiber plugs to be attached to and detached from the optical connector unit; a member for location, with each of the optical fiber plugs being inserted into respective opening holes of the member for location; an adaptor, a front part of each of the optical fiber plugs being individually inserted into and connected to the adaptor; a connection jig for pushing the member for location toward a side of the adaptor and then for inserting the front part of each of the optical fiber plugs into the adaptor; and a detachment jig for detaching each of the optical fiber plugs from the adaptor by being engaged with the member for location and then by pulling the member for location.

7 Claims, 3 Drawing Sheets

US 7,871,203 B2

OPTICAL CONNECTOR UNIT

TECHNICAL FIELD

The present invention relates to an optical connector unit, and specifically to an optical connector unit, that it becomes possible to attach and then to detach each of optical fiber plugs as a plurality of pieces therefor by making use thereof.

BACKGROUND ART

There is a case where optical fiber plugs as a plurality of pieces therefor are mounted onto such as an adaptor of an equipment or the like. In such the case thereof, it is necessary to insert and connect each of such the optical fiber plugs as one by one for the adaptor thereof. Moreover, there are disclosed such the technology in a patent document 1 (Japanese Patent Application Publication No. H05 (1993)-119239) and in a patent document 2 (Japanese Patent Application Publication No. H10(1998)-031131).

However, according to the patent document 1 and the patent document 2, to work for connecting the optical fiber plugs to the adaptor, or to work for disconnecting the same therefrom, it is too troublesome to work therefor. And then it cannot help but be taken further working hours therefor in a case where there becomes to be increased a number of the pieces regarding such the optical fiber plugs.

And then for dissolving such the above mentioned subjects, it is an object of the present invention to provide an optical connector unit, that it becomes able to attach and then to detach each of optical fiber plugs as a plurality of pieces therefor by making use thereof, as certainly therefor and easier.

BRIEF SUMMARY OF THE INVENTION

For dissolving the above mentioned subjects, a first aspect of an optical connector unit according to the present invention is characterized in that the optical connector unit comprises: optical fiber plugs as a plurality of pieces therefor; a member for location, for inserting thereinto each of the optical fiber plugs as a plurality of the pieces therefor, and then for locating the same; an adaptor, for inserting thereinto a front part on each of the optical fiber plugs, and then for connecting the same thereto individually; a connection jig, for pushing the member for location toward a side for the adaptor, and then for inserting the front part on each of the optical fiber plugs into the adaptor; and a detachment jig, for detaching each of the optical fiber plugs as a plurality of the pieces therefor from the adaptor, by being engaged with the member for location and then by pulling the same.

A second aspect of an optical connector unit according to the present invention is characterized in that the connection jig is designed to be arranged at an outside of each of the optical fiber plugs as a plurality of the pieces therefor, that are objects to be attached.

A third aspect of an optical connector unit according to the present invention is characterized in that the connection jig comprises as preferably: thrust parts, for bumping against the member for location, and then for pushing the same; and an operating part to be connected to the thrust part, and then for giving a force toward the thrust part.

A fourth aspect of an optical connector unit according to the present invention is characterized in that the detachment jig is designed to be arranged at an outside of each of the optical fiber plugs as a plurality of the pieces therefor, that are objects to be detached.

A fifth aspect of an optical connector unit according to the present invention is characterized in that the detachment jig comprises an engagement part to be engaged with a protrusion part that is formed at the member for location.

DETAILED DESCRIPTION OF THE INVENTION

A preferred embodiment according to the present invention will be described in detail below, with reference to the drawings.

Figure 1:
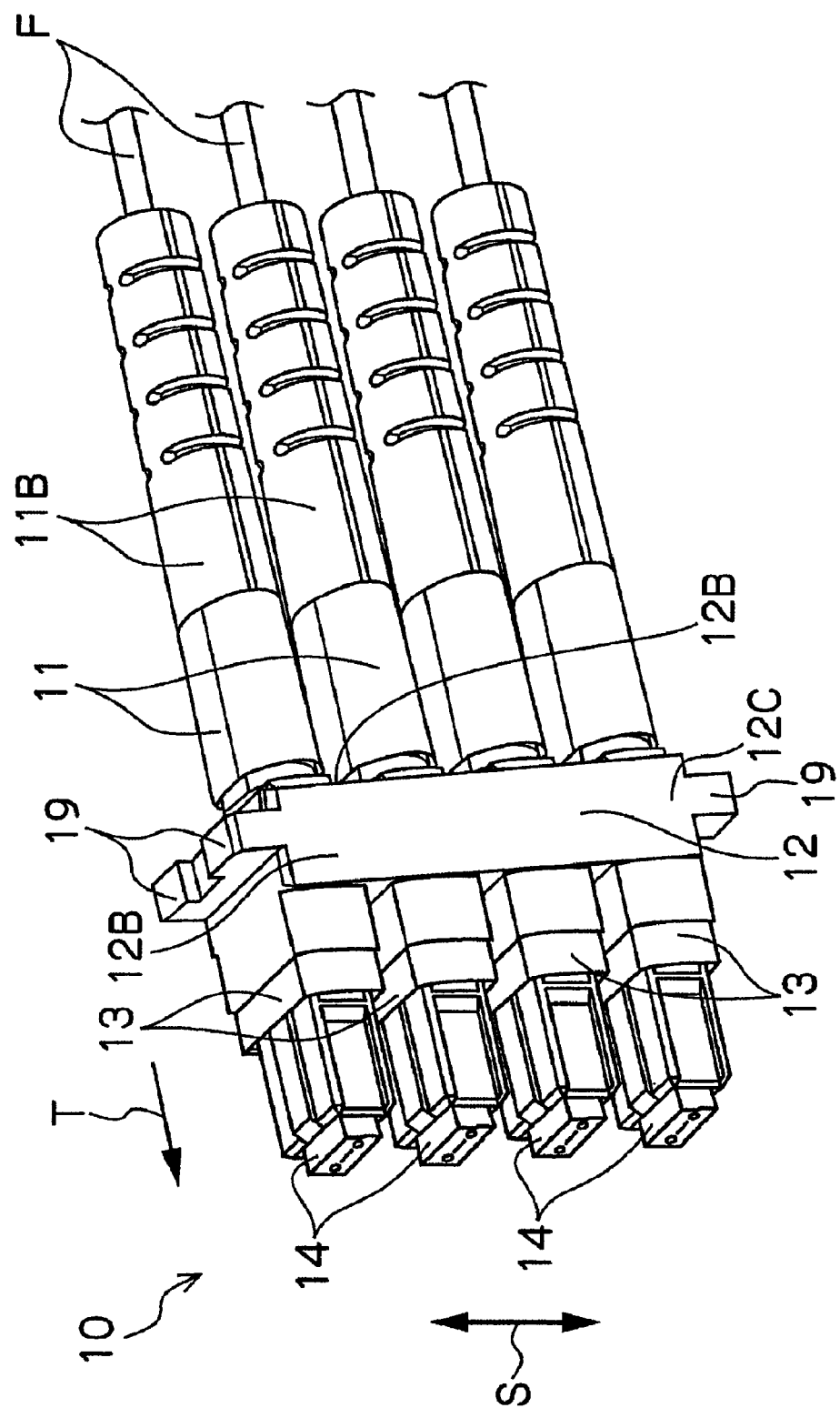
FIG. 1 is a diagrammatic perspective view showing a member for location and optical fiber plugs as a plurality of pieces therefor according to a preferred embodiment regarding an optical connector unit according to the present invention.

Here, FIG. 1 is a diagrammatic perspective view for showing a portion regarding a preferred embodiment of an optical connector unit according to the present invention. Moreover, FIG. 2 and FIG. 3 individually show examples of a whole structure according to an optical connector unit.

Figure 2:
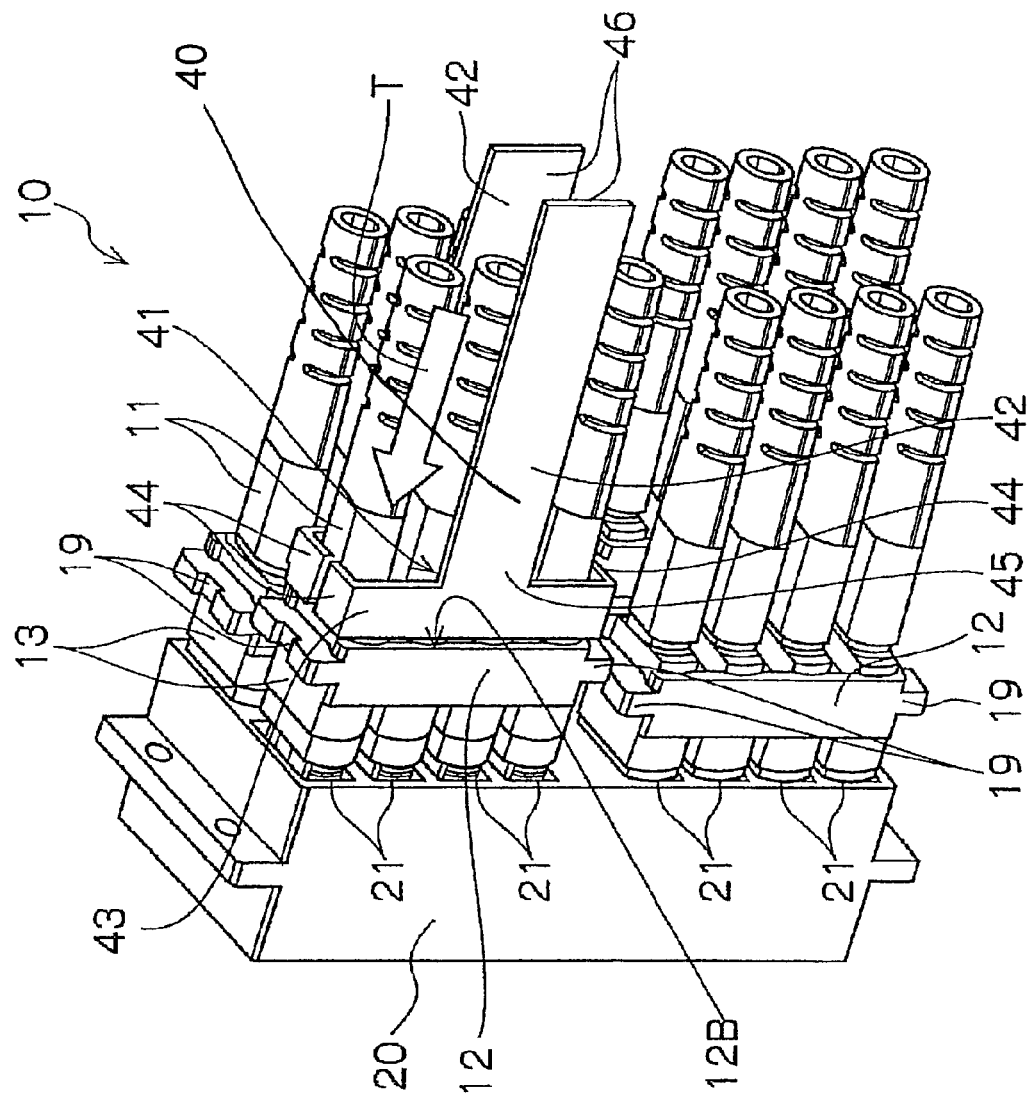
FIG. 2 is a diagrammatic perspective view showing a connection jig, for pushing a member for location toward an adaptor of an optical connector unit, and then for connecting each of optical fiber plugs thereto.

As shown in FIG. 1 and in FIG. 2, an optical connector unit 10 is used to determine a location for each of optical fiber plugs 11 to be attached to and detached from the optical connector unit 10. Further, as shown in FIG. 2, the optical connector unit 10 includes the optical fiber plugs 11 as sixteen pieces therefor; and a member for location 12 as four pieces therefor.

Still further, the parts as shown in FIG. 1 are the member for location 12 as one piece therefor and the optical fiber plugs 11 as four pieces therefor. Still further, each of such the optical fiber plugs 11 comprises a boot 11B. And then the same individually holds each of the optical fibers as an F with making use thereof respectively. Still further, there is designed to be exposed a ends of such the optical fibers as the F toward a front part 14 of a ferrule on each of such the optical fiber plugs 11 respectively.

The member for location 12 comprises an opening hole for plug insertion 13 as four pieces therefor along a direction S, as shown in FIG. 1. Still further, each of the optical fiber plugs 11 is designed to be inserted into a respective opening hole for plug insertion 13, and then thereby the optical fiber plugs 11 are designed to be located along a direction T mutually in parallel to each other. Furthermore, the member for location 12 includes individually formed protrusion parts 19 at one end part 12B of the member for location 12 and another end part 12C thereof.

Figure 3:
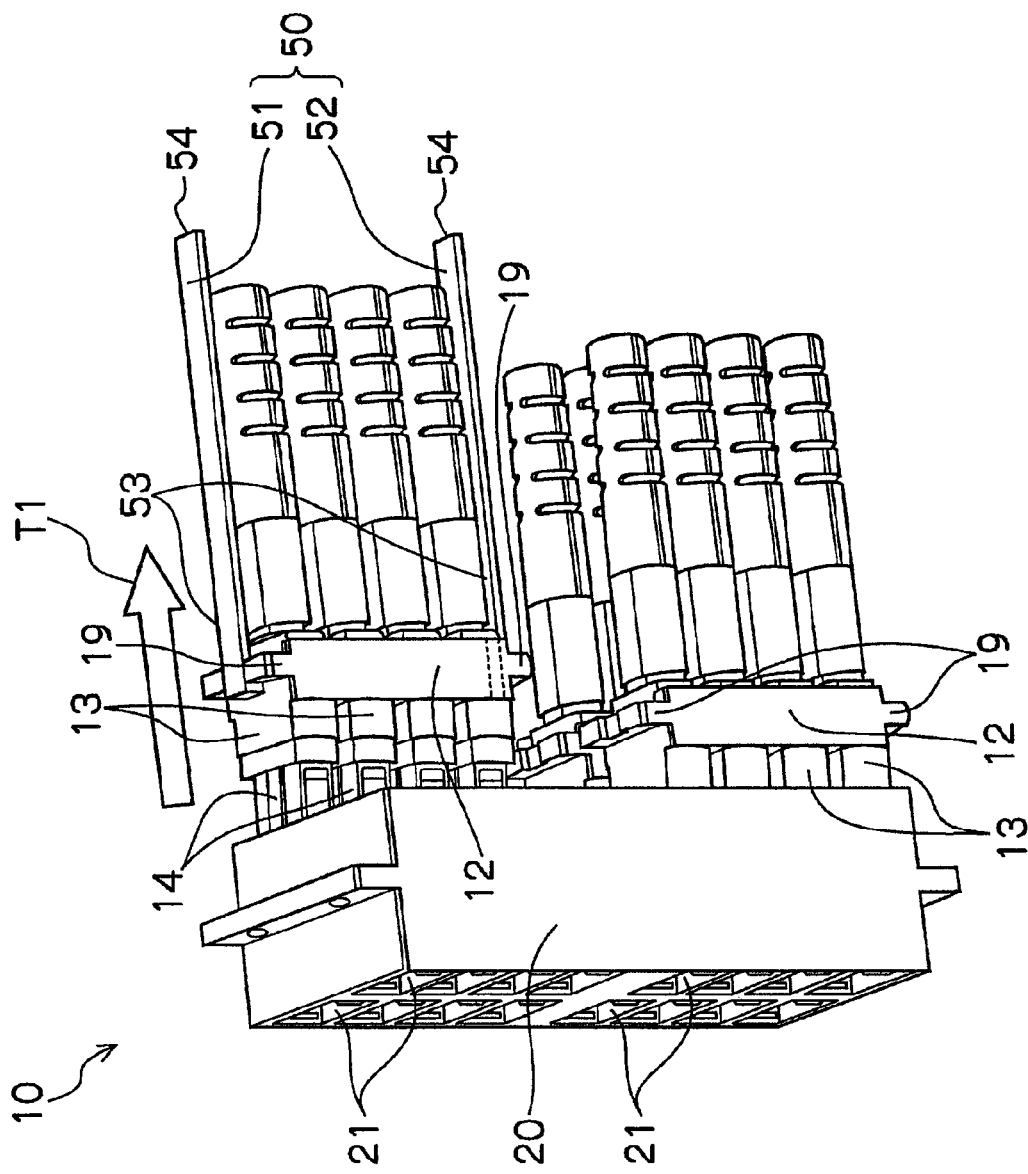
FIG. 3 is a diagrammatic perspective view showing a detachment jig, for detaching a member for location and each of optical fiber plugs from an adaptor of an optical connector unit.

Next, an adaptor 20 as shown in FIG. 2 and in FIG. 3 is designed to be attached on such as a casing of an equipment or the like. Moreover, such the adaptor 20 comprises plug guide holes 21 as the same number as the number of pieces for the optical fiber plugs 11. Further, to each of such the plug guide holes 21, there is designed to be inserted the front part 14 on the ferrule on each of the optical fiber plugs 11, and then there becomes to be optically connected to each of therebetween.

According to the examples as shown in FIG. 2 and in FIG. 3, four members for location 12 face against the adaptor 20.

And then sixteen optical fiber plugs 11 are designed to be fitted into and connected to the individual plug guide holes 21.

The optical connector unit 10 further comprises a connection jig 40 to be used where each of the optical fiber plugs 11 is connected to the optical connector unit 10, as shown in FIG. 2. Still further, the optical connector unit 10 further comprises a detachment jig 50 to be used where each of the optical fiber plugs 11 becomes detached therefrom, as shown in FIG. 3. Both of the connection jig 40 and the detachment jig 50 are individually formed by bending a thin plate or the like.

Still further, such the connection jig 40 as shown in FIG. 2 is a jig for inserting each of the optical fiber plugs as the four pieces therefor into the corresponding plug guide holes 21 of the adaptor 20 respectively, with making use of the member for location 12 that corresponds thereto, which is pushed by an operator against each of such the member for location 12. Still further, there is designed to be produced such the connection jig 40 with making use of such as plastic, metal, or the like, and then the same comprises: thrust parts 41; and operating parts 42 as two pieces therefor.

The thrust parts 41 are frame members having a U-shape, and comprise: wider side parts 43, and narrower side parts 44. And two thrust parts 41 in connecting jig face each other in such way so as to form a rectangular frame. Still further, the wider side parts 43 of the two and the narrower side parts 44 of the two bump against a bumping face 12B of the member for location 12 that corresponds thereto.

Still further, there are individually designed the operating parts 42 as the two pieces therefor to be formed in parallel to each other. Still further, there is designed one end part 45 on each of such the operating parts 42 to be connected at a location as intermediate for between the wider side parts 43. Still further, there is designed another end part 46 on each of the operating parts 42 as the part to be held by an operator with making use of such as fingers or the like.

Still further, the detachment jig 50 as shown in FIG. 3 comprises: a first member 51; and a second member 52. Still further, one end part of the first member 51 and one end part of the second member 52 are engagement parts 53 to be individually engaged with the protrusion parts 19 of the member for location 12 respectively. Still further, there are individually designed such the engagement parts 53 to be such as approximately in the shape of the letter 'L' or the like. Furthermore, there are individually designed another end part 54 of the first member 51 and another end part 54 of the second member 52 as the parts to be held by an operator with making use of such as fingers or the like.

Next, a process for connecting any one of the optical fiber plugs 11 according to the optical connector unit 10 and a process for detaching any one of such the optical fiber plugs 11 therein will be described in detail below, with reference to FIG. 1 through FIG. 3.

First of all, the optical fiber plugs 11 as the four pieces therefor becomes to be determined the location mutually for each of therebetween by being inserted into the individual opening holes for plug insertion 13 at the location to correspond thereto of the member for location 12, as shown in FIG. 1. Moreover, there are individually designed to be produced as four pairs for assembled bodies, that individually comprised of such the optical fiber plugs 11 as the four pieces therefor and of the member for location 12.

And then thereafter, there becomes to be mounted such the assembled bodies as the four pairs therefor, that are individually comprised of such the optical fiber plugs 11 and of the member for location 12, onto the adaptor 20 one after the other, by making use of the connection jig 40, as shown in FIG. 2. That is to say, there becomes to be inserted the front part of the ferrule on each of the optical fiber plugs 11 as the four pieces therefor with the member for location 12 into the corresponding plug guide holes 21 of the adaptor 20 respectively, due to the thrust part 41 of the connection jig 40 becoming to be pushed by an operator against each of the member for locations 12 along the direction as the T. And then in such the case thereof, there becomes to be located each of such the optical fiber plugs 11 as the four pieces therefor, that are the objects to be attached thereon, at an inner side of the thrust part 41 on the connection jig 40 and of the operating parts 42 thereon as the two pieces therefor respectively. Therefore, there is designed each of such the optical fiber plugs 11 as not to be an obstacle to work for inserting thereof, and then it becomes able to perform easier such the work for inserting thereof. Further, regarding such the operation for inserting thereof, there becomes to be performed individually for each of the member for locations 12.

On the contrary, in a case of detaching such the assembled bodies as the four pairs therefor from the adaptor 20, that are individually comprised of such the optical fiber plugs 11 and of the member for location 12 and that are attached on the adaptor 20, as shown in FIG. 3, there becomes to be hung up the engagement part 53 of the first member 51 in the detachment jig 50 and the engagement part 53 of the second member 52 therein onto the individual protrusion parts 19 that correspond thereto respectively.

And then thereafter, it becomes able to detach easier such the assembled bodies as the four pairs therefor from the adaptor 20 one after the other, that are individually comprised of such the optical fiber plugs 11 and of the member for location 12, due to the first member 51 in the detachment jig 50 and the second member 52 therein to be pulled by an operator along the direction as the T1. Furthermore, there is designed each of such the optical fiber plugs 11 as not to be an obstacle to work for detaching each of the member for locations 12 and each of the optical fiber plugs 11, because there becomes to be located each of such the optical fiber plugs 11 as the four pieces therefor, that becomes to be the objects to be detached therefrom, at the inner side of the first member 51 in the detachment jig 50 and the second member 52 therein in such the case thereof. Thus, it becomes able to perform easier such the work for detaching thereof.

Here, such the optical connector unit according to the present invention comprises: the optical fiber plugs as the plurality pieces therefor; the member for location, for inserting thereinto and then determining the location of the optical fiber plugs as the plurality pieces therefor; the adaptor, for inserting thereinto and then connecting thereto the front part on each of such the optical fiber plugs; the connection jig, for pushing the member for location against the side for the adaptor, and then for the front part on each of such the optical fiber plugs to be inserted into the adaptor; and the detachment jig, for detaching each of such the optical fiber plugs as the plurality pieces therefor from the adaptor, by being engaged with the member for location, and then by being pulled the same. And then thereby it becomes able to attach and then to detach each of such the optical fiber plugs as the plurality pieces therefor to and then from such the adaptor as certainly therefor and easier.

Moreover, there is designed such the connection jig to be arranged at the outer side for each of the optical fiber plugs as the plurality pieces therefor, that are the objects to be attached thereto. And then thereby it becomes able to perform easier such the work for attaching thereto, because there is designed each of such the optical fiber plugs as not to be an obstacle to work for attaching thereto.

Further, such the connection jig is characterized in that the same comprises: the thrust part, for bumping against the member for location, and then for pushing the same; and the operating part to be connected to such the thrust part, and then for giving a force toward such the thrust part. And then thereby it becomes able to be attached each of the optical fiber plugs as the plurality pieces therefor as certainly, that are the objects to be attached thereto, onto the adaptor via the member for location.

Still further, there is designed such the detachment jig to be arranged at the outer side for each of the optical fiber plugs as the plurality pieces therefor, that are the objects to be detached therefrom. And then thereby it becomes able to perform the work easier for detaching such the optical fiber plugs therefrom, because there is designed each of such the optical fiber plugs as not to be an obstacle to work for detaching therefrom.

Still further, such the detachment jig comprises the engagement part to be engaged with the protrusion part that is formed at the member for location. And then thereby it becomes able to attach easier such the detachment jig onto the member for location. And then making use thereof, it becomes able to perform the work easier for detaching such the optical fiber plugs therefrom.

Still further, according to the present invention, it becomes able to provide the optical connector unit, that it becomes able to attach and then to detach each of optical fiber plugs as a plurality of pieces therefor by making use thereof, as certainly therefor and easier.

Still further, the present invention is not limited to the embodiment as described above, and it is able to adopt a variety of modified examples therefor. For example, each of the shapes of the connection jig 40 and of the detachment jig 50 is not limited to the examples as shown in the figures. Furthermore, the number of pieces regarding the optical fiber plugs to be determined the individual locations by making use of the member for location is not limited thereto in particular.

What is claimed is:

1. An optical connector unit, comprising:
   a plurality of optical fiber plugs to be attached to and detached from the optical connector unit;
   a member for location, each of the optical fiber plugs being inserted into respective opening holes of the member for location;
   an adaptor, a front part of each of the optical fiber plugs being individually inserted into and connected to the adaptor;
   a connection jig for pushing the member for location toward a side of the adaptor and then for inserting the front part of each of the optical fiber plugs into the adaptor; and
   a detachment jig for detaching each of the optical fiber plugs from the adaptor by being engaged with the member for location and then by pulling the member for location,
   wherein the detachment jig includes an engagement part that engages with a protrusion part protruding from the member for location.

2. The optical connector unit as claimed in claim 1, wherein the connection jig is arranged at an outside of each of the optical fiber plugs, the optical fiber plugs being objects to be attached to the optical connector unit.

3. The optical connector unit as claimed in claim 2, wherein the connection jig comprises:
   a plurality of thrust parts that bump against the member for location, and then push the member for location; and
   an operating part connected to the thrust part and that gives a force toward the thrust part.

4. The optical connector unit as claimed in claim 3, wherein the thrust part is a rectangular frame member including two wider side parts and two narrower side parts.

5. The optical connector unit as claimed in claim 1, wherein the detachment jig is arranged at an outside of each of the optical fiber plugs as a plurality, the optical fiber plugs being objects to be detached from the optical connector unit.

6. The optical connector unit as claimed in claim 1, wherein the engagement part of the detachment jig has approximately an L shape.

7. The optical connector unit as claimed in claim 1, wherein the protrusion part of the member for location includes a recess, the engagement part is formed in one end of the detachment jig and is engaged with the recess, and the detachment jig includes a part configured to be held by an operator at an end opposite the one end.

* * * * *